United States Patent [19]

Miller

[11] Patent Number: 5,079,432
[45] Date of Patent: Jan. 7, 1992

[54] METHOD AND APPARATUS FOR MEASURING THE DISPLACEMENT OF AN AUTOMATIC SCAN TRACKING HEAD

[75] Inventor: Sidney D. Miller, Mountain View, Calif.

[73] Assignee: Ampex Corporation, Redwood City, Calif.

[21] Appl. No.: 543,283

[22] Filed: Jun. 25, 1990

[51] Int. Cl.⁵ .......................................... G01N 21/86
[52] U.S. Cl. .................................................. 250/561
[58] Field of Search ............... 250/561, 239, 231.1, 250/229, 222.1, 227.21; 33/558, 558.01

[56] References Cited

U.S. PATENT DOCUMENTS

| | | |
|---|---|---|
| 3,258,686 | 6/1966 | Selgin . |
| 3,423,592 | 1/1969 | Selgin . |
| 3,781,110 | 12/1973 | Leitz et al. . |
| 3,969,575 | 7/1976 | Gerritsen et al. . |
| 4,021,119 | 5/1977 | Stauffer . |
| 4,071,297 | 1/1978 | Leitz et al. . |
| 4,325,016 | 4/1982 | Takeuchi . |
| 4,403,144 | 9/1983 | Strahan et al. ............ 250/231.1 |
| 4,493,212 | 1/1985 | Nelson ...................... 250/231.1 |
| 4,626,680 | 12/1986 | Martens et al. ........... 250/227.21 |
| 4,935,621 | 6/1990 | Pikulski .................... 250/229 |

FOREIGN PATENT DOCUMENTS

| | | |
|---|---|---|
| 6074132 | 4/1985 | Japan . |
| 783524 | 9/1957 | United Kingdom . |
| 1080726 | 8/1967 | United Kingdom . |

*Primary Examiner*—David C. Nelms
*Assistant Examiner*—Khaled Shami
*Attorney, Agent, or Firm*—George B. Almeida; Elizabeth E. Strnad

[57] ABSTRACT

In a head displacement measuring apparatus, a folded optical path is used to introduce a collimated beam of light from a light source to a split photo detector, wherein both the light source and the split photo detector are mounted external of the support housing which secures and supports the flexible head assembly. A pair of optical prisms direct the light beam parallel to a head supporting blade integral with the head assembly. A Fresnel lens secured to the blade, preferably at the head end, varies the position of the path of the light beam in response to lateral displacement of the blade and head, to likewise vary the extent that the beam impinges one or the other of the photo detectors. The difference of the signals from the split photo detector provides a precise measurement of the transverse displacement of the head from a nominal centered position.

12 Claims, 1 Drawing Sheet

METHOD AND APPARATUS FOR MEASURING THE DISPLACEMENT OF AN AUTOMATIC SCAN TRACKING HEAD

The present invention relates to tracking control systems for rotary heads, and in particular to a method and apparatus for measuring the transverse displacement of an automatically tracking magnetic head in a rotating scanner assembly.

BACKGROUND OF THE INVENTION

Helical scan recording apparatus include a scanner drum assembly, wherein a magnetic head is mounted within an upper drum which rotates at high speed relative to a longitudinally moving tape which is helically wrapped about the drum assembly, so as to scan tracks that are arranged in parallel segments diagonally across the tape length. To cause the magnetic head to follow a previously recorded track, it has been usual to mount the head on the end of a supporting blade that pivots or flexes transversely to the direction of head rotation and thus tape movement, in response to a magnetic drive. A tracking signal is derived from the continuously rotating flexible head to determine its lateral position with respect to the track being read. The tracking signal provides an indication that the head is either exactly centered on the track, or is off center on either side of the track. This tracking signal then is used in a closed position servo loop, in conjunction with a separately measured head displacement signal of a closed displacement servo loop, to control the pivoting or flexing of the head supporting blade to keep the head centered on the track.

Because the strength of the tracking signal is directly related to a precise alignment of the flexible head with the center of the track, it is a critical operating parameter of the scanner assembly that the position of the head be precisely known relative to a nominal centered displacement, as well as to the track center. Thus, it is important that the head displacement measurement is accurate and free of noise and phase shift over a wide bandwidth, so that it may be used in the closed position servo loop which is driven by the tracking error signal. The combined position and displacement servo loops correct any tracking errors.

The measured displacement is used for two purposes. The first is to provide a feedback signal which allows the closed position servo to be constructed for the purpose of providing uniform response over a wide range of frequencies. The second is to provide a linear and known relationship between head displacement and voltage. This allows the head to be offset by a known amount for the purpose of "jumping over" tracks as needed in slow and fast motion playback.

However, typical head displacement measurement techniques determine lateral head displacement by employing a light source in conjunction with a moving slit secured to the flexible blade which supports the head. The movement of the slit varies accordingly the amount of light from the light source which impinges either of a pair of photo detectors. The amount of light which is detected by one or the other photo detector is proportional to the degree of lateral movement of the blade supporting the magnetic head. Thus the comparative values of the signals generated by the two photo detectors is indicative of the displacement of the head itself from a nominal centered position.

However, typical measurement techniques experience several inherent disadvantages. For example, a typical arrangement places the light source and the photo detectors within a support housing which secures the flexible head assembly in the rotatable upper drum, thereby substantially complicating the circuitry extending into the region of the head assembly. In addition, placing the light source and the photo detectors in the proximity of the head supporting member is undesirable since space is at a premium in the support housing which contains the flexible head assembly. Further, because of the optical arrangement of the light source, the slit, and the detectors relative to the head assembly itself, the slit and the photo detectors "see" a different portion of the light generated by the light source. That is, as the head is deflected over its range of transverse displacement, a varied gradient of the light generated by the surface of the bulb is used as the working part of the beam, causing non-linearities in the resulting head displacement signal. Moreover, in such a typical arrangement, an electromagnetic voice coil included in the driving mechanism of the automatic scan tracking system is located closely to the photo detectors. This, in turn, results in undesirable crosstalk between the voice coil of the automatic scan tracking system and the photo detectors of the head displacement measurement apparatus.

Accordingly, it would be highly desirable to remove the light source and the photo detectors from within the support housing of the flexible head assembly. Further it would be desirable to move the light source and the photo detectors away from the voice coil of the automatic scan tracking mechanism so as to substantially reduce the cross talk between the head displacement measurement apparatus and the automatic scan tracking system. Also, it would be desirable to modify the light source to provide a small or zero gradient of light across the full displacement range of the automatic scan tracking head, thereby eliminating non-linearities in the head displacement signal.

SUMMARY OF THE INVENTION

Accordingly, the present invention overcomes the above disadvantages of the prior art while providing apparatus for measuring the displacement, from a selected nominal centered position, of a flexible magnetic head mounted in a scanner drum assembly. The scanner drum assembly includes a rotatable upper drum and a stationary lower drum, and a head support housing secured within the upper drum for housing therein the flexible head assembly. The head assembly includes a flexible blade with opposite ends, with a fixed end of the blade rigidly secured to the support housing, and with a pivotable end extending therefrom to an opening in the upper drum and supporting the magnetic head. The head is secured to the pivotable end and protrudes from the drum via an opening therein for contact with the tape.

In accordance with the invention, a light source and a pair of photo detectors are disposed externally of the head support housing and thus are removed from the proximity of the flexible head assembly. A folded optical assembly provides a folded optical path within the head support housing, to form the light from the light source into a light beam which extends along a path adjacent to the flexible blade. A fixed optical stop adjacent to the light source and external to the support housing, collimates a portion of the light and the resulting collimated light beam is transmitted to a first mirror element of the folded optical assembly, and thence to a second mirror element thereof. The optical assembly thus provides the folded beam path which extends in part generally parallel to the flexible blade supporting the head. A Fresnel lens is secured to the flexible blade and extends therefrom to intercept the light path extending from the first mirror element to the second mirror element. Displacement of the flexible blade in either lateral direction causes a corresponding displacement of the Fresnel lens which, in turn, varies accordingly the optical path of the light beam directed from the Fresnel lens to the second mirror element. The second mirror element transmits the variation in the optical path of the light beam to the split photo detector secured externally of the head support housing, to thereby generate a displacement signal indicative of displacement of the flexible blade and thus of the magnetic head from its nominal centered position.

It may be seen that the present invention overcomes the disadvantages of the prior art by removing the light source and photo detectors from within the confines of the head support housing which houses the flexible head assembly, and by using a folded optical path to introduce the collimated light beam into the enclosure. This in turn, removes the need for electrical connections to extend into the support housing, thereby simplifying the electrical circuitry. In addition, the invention provides a fixed gradient of light for the cross section of the working portion of the light beam throughout the full displacement of the magnetic head. Further, the invention optical configuration eliminates cross-talk between the voice coil assembly and the photo detectors.

These and other advantages are further described in the detailed description and drawings which follow.

DETAILED DESCRIPTION OF THE PREFERRED EMBODIMENTS

Figure 1:
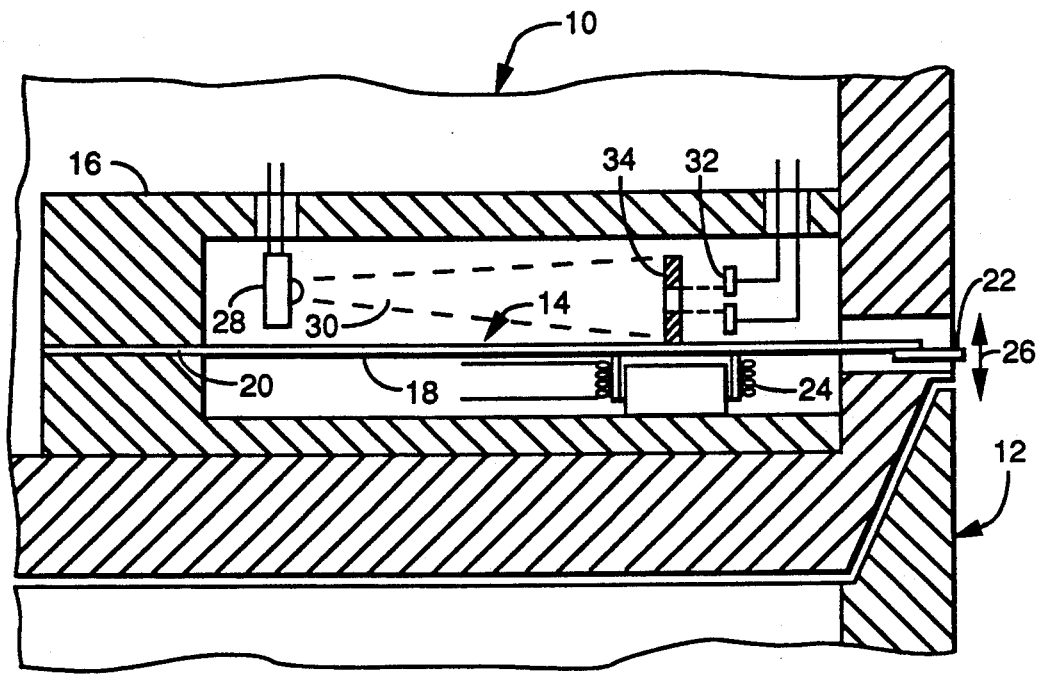
FIG. 1 is a partial cross section of a head support housing and a flexible head assembly positioned within a scanner drum assembly, depicting a head displacement measuring apparatus of the prior art.

Referring first to FIG. 1, a scanner drum assembly typically includes a rotatable upper drum 10 and a stationary lower drum 12. At least one flexible head assembly 14, is secured within the rotatable upper drum 10 by means of a head support housing 16. The housing 16 is adapted to support a cantilevered flexible blade 18 which is suitably secured thereto at a fixed end 20. The other pivotable end depends from the fixed end and has secured thereto a magnetic head 22. Positioned adjacent to blade 18 near the head 22 is apparatus exemplified in FIG. 1 by a voice coil 24 and associated electrical drive connections, which voice coil 24 provides the magnetic drive to pivot the flexible blade 18, and thus the head 22, through a selected transverse displacement depicted by arrow 26, relative to the direction of rotation of the upper drum 10.

In known head displacement measurement systems, such as depicted in FIG. 1, transverse displacement of the blade 18 and head 22 in either direction is detected by means of an electro-optical assembly disposed within the support housing 16 which houses the flexible head assembly 14. At the fixed end 20 a light source 28 is suitably secured within the support housing 16, and generates a non-uniform light beam 30 which is directed toward a pair of photo detectors 32, also secured within the enclosure 16. Mounted on the blade 18 on the end thereof near the photo detectors 32, is an optical slit 34 which intercepts the non-uniform light beam 30.

As may be seen in FIG. 1, the typical head displacement measurement scheme locates both the light source 28 and the split photo detector 32 elements within the support housing 16 and in the immediate proximity of the flexible head assembly 14 and the voice coil 24. Thus the non-uniform light beam 30 is directed generally towards the split photo detector 32, whereupon a portion of the beam cross section is allowed to pass by the optical slit 34. It may be seen that displacement of the head 22 in a transverse direction (arrow 26) causes corresponding displacement of the slit 34, which thus passes a different cross section of the non-uniform light beam 30. This, in turn, directs more or less light to the respective light detectors of the split photo detector 32, in proportion to the extent and direction of the transverse head displacement. The electrical signals generated by the respective detectors is compared and the difference therebetween is indicative of the lateral position of the head relative to the nominal centered head position.

It may be seen that space is very limited within the head support housing 16 and accordingly, it is inconvenient to locate many components within the housing. In addition, such an arrangement requires that an additional two pairs of connecting wires be extended into the support housing 16 in the region of the flexible blade 18. More importantly, when the optical slit 34 of such arrangement is laterally displaced relative to the light impinging thereon, it "sees" a different portion of the light generated by the light source. That is, the light gradient of the generated light, over the surface of a light bulb, varies substantially. It follows that as the slit 34 intercepts different cross sections of the light beam 30, the varying light gradient causes undersirable non-linearities in the output tracking signals generated by the split photo detector 32. In addition, the above arrangement of placing the split photo detector 32 near the voice coil 24, causes excessive crosstalk therebetween, which also undesirably affects the output displacement signals.

Figure 2:
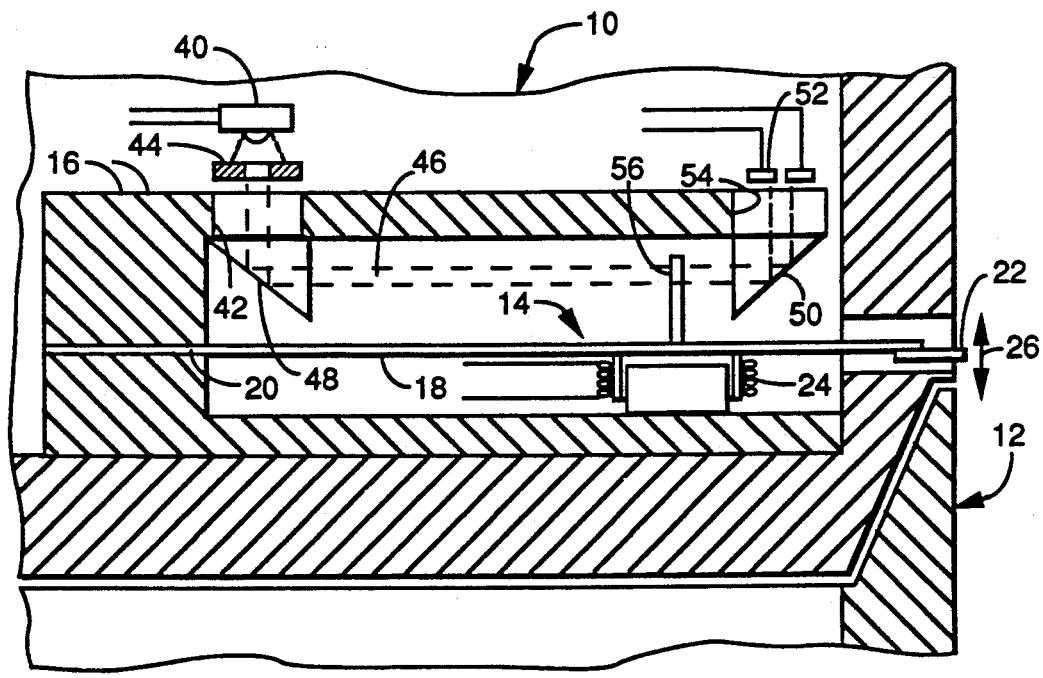
FIG. 2 is a partial cross section of a head support housing and a flexible head assembly positioned within a scanner drum assembly, depicting a head displacement measuring apparatus of the present invention.

Referring now to FIG. 2, the improved head displacement measurement apparatus of the invention is depicted. Like components of the FIGS. 1 and 2 are similarly numbered. Thus, the head support housing 16 secures therewithin the flexible head assembly 14, including the flexible blade 18 which, in turn, supports the magnetic head 22 for transverse motion as depicted by the arrow 26.

However, in accordance with the invention, a light source 40 is suitable secured to the exterior of the head support housing 16, or to the upper drum 10, via a suitable bracket (not shown), with the light beam therefrom directed through a hole 42 in the housing 16. A fixed optical stop 44 also is secured to the exterior of the support housing 16, for example by the same bracket, whereby the stop 44 forms a collimated light beam 46 having a cross section which maintains a constant light gradient regardless of the extent of displacement of the head 22. A first mirror or optical prism 48 is suitably secured within the support housing 16, and redirects the collimated light beam 46 towards the head 22 generally parallel to the blade 18. A second mirror or optical prism 50 re-directs the collimated light beam 46 out of the support housing 16 via a hole 54 therein, to impinge the collimated light beam 46 onto a split photo detector 52. The latter is suitably secured to the exterior of head support housing 16 as by a bracket (not shown). A Fresnel lens 56, or other suitable optical lens, is secured to the flexible blade 18 and extends therefrom to intercept the collimated light beam 46. The optical parameters of the lens 56 are selected to cause it to focus the image of the optical stop 44 on the image plane of the split photo detector 52, via the optical prism 50.

It may be seen that when the head 22 is laterally displaced via the voice coil 24, the Fresnel lens 56 is correspondingly displaced and causes a change in the optical path of the light beam. This causes the light beam 46 to strike the prism 50 surface at a different position which, in turn, causes a corresponding change in the position of the beam which impinges the split photo detector 52. That is, the beam is swept across the respective photo detectors in response to the head displacement. Thus a displacement of the head in one direction from a nominal or centered position, causes the beam to more fully impinge one photo detector, while a head displacement in the other direction causes the beam to more fully impinge the other photo detector. If the head is not displaced from the nominal centered position, the light beam impinges both photo detectors equally, thereby generating an output signal therefrom indicative of such a centered condition.

Although the invention is described herein relative to a specific embodiment of a helical scan head assembly and scanner drum assembly, it is to be understood that the invention is not limited to use with such assemblies, or to the video field, but also contemplates use as a displacement measuring apparatus for any laterally displaced member in mechanisms other than video recorders, whether the member is cantilevered or laterally moveable in its entirety. Likewise, the locations of the light source 40 and the split photo detectors may be reversed, if desired. Also, the Fresnel lens 56 may be repalced by any of variously available and suitable lenses capable of focusing the image of the optical stop 44 onto the image plane of the split photo detector 52, and of changing the path of the beam reflected by the prism 50.

What is claimed is:

1. Apparatus for measuring the lateral displacement of an automatic scan tracking head secured for lateral displacement to one end of a cantilevered flexible member which is secured at its other end to a support housing, comprising:

optical means, including a light source means external of the support housing, for supplying a collimated light beam towards one end of the member, light reflecting means within the support housing for providing the beam generally parallel to the member and for re-directing the beam away from the member at its other end and out of the support housing;

lens means secured to said member and disposed to intercept the collimated light beam, for varying the path of the re-directed beam in response to displacement of the member while focusing the beam onto preselected image plane; and optical detector means external to said support housing for receiving the re-directed light beam at said preselected image plane, for generating an electrical signal representative of the displacement of the member.

2. The apparatus of claim 1 wherein said light source means includes a light source for supplying a non-uniform light beam, and an optical stop for supplying said collimated light beam from the non-uniform light beam.

3. The apparatus of claim 1 wherein said optical means further includes:

optical stop means for forming said collimated light beam; and mirror means secured within the support housing at substantially opposite ends of the member and forming a folded optical path by which the collimated light beam is introduced to, and extracted from, the support housing.

4. The apparatus of claim 1 wherein the lens means is a Fresnel lens.

5. Apparatus for measuring the displacement of a flexible member which is secured at one end within a support housing, with the other end pivotable about the secured end, comprising:

means external of the support housing for supplying a collimated light beam into the housing;

light reflecting means disposed to receive said collimated light beam, for directing the light beam along the flexible member, and for re-directing the collimated light beam away from the flexible member;

means interrupting said collimated light beam and responsive to displacement of said flexible member, for changing accordingly the position of the path of the re-directed collimated light beam; and optical detector means external of the support housing and disposed to receive the re-directed collimated light beam, for generating a signal indicative of the displacement of the pivotable end.

6. The apparatus of claim 5 wherein the means for supplying includes:

a light source externally secured to the support housing; and an optical stop means externally secured to the support housing and optically responsive to the light source to supply said collimated light beam.

7. The apparatus of claim 5 wherein the light reflecting means includes:

a first mirror means secured within the support housing for directing the collimated light beam along the flexible member; and a second mirror means secured within the support housing and spaced from the first mirror means for re-directing the collimated light beam out of the support housing and into the optical detector means.

8. The apparatus of claim 5 wherein the changing means is a Fresnel lens.

9. Apparatus for measuring the displacement of a magnetic head secured for lateral displacement to one end of a cantilevered flexible member which is secured at its other end to a support housing, comprising:

light source means secured externally of the support housing for introducing a collimated light beam into the support housing;

first mirror means secured within the support housing for directing the collimated light beam generally parallel to the flexible member;

second mirror means secured within the support housing for re-directing the collimated light beam back out of the support housing;

lens means secured for lateral displacement with the flexible member while intercepting the collimated light beam; and light detecting means secured externally of the support housing for receiving the re-directed collimated light beam.

10. The apparatus of claim 9 wherein the light source means includes an optical stop for providing the collimated light beam.

11. The apparatus of claim 9 wherein the lens means is a Fresnel lens, and the mirror means are optical prisms.

12. The apparatus of claim 9 wherein lateral displacement of said magnetic head causes said lens means to change the path of the re-directed collimated light beam to sweep the latter light beam across the light detecting means in response to the lateral displacement.

* * * * *